Figure 1:
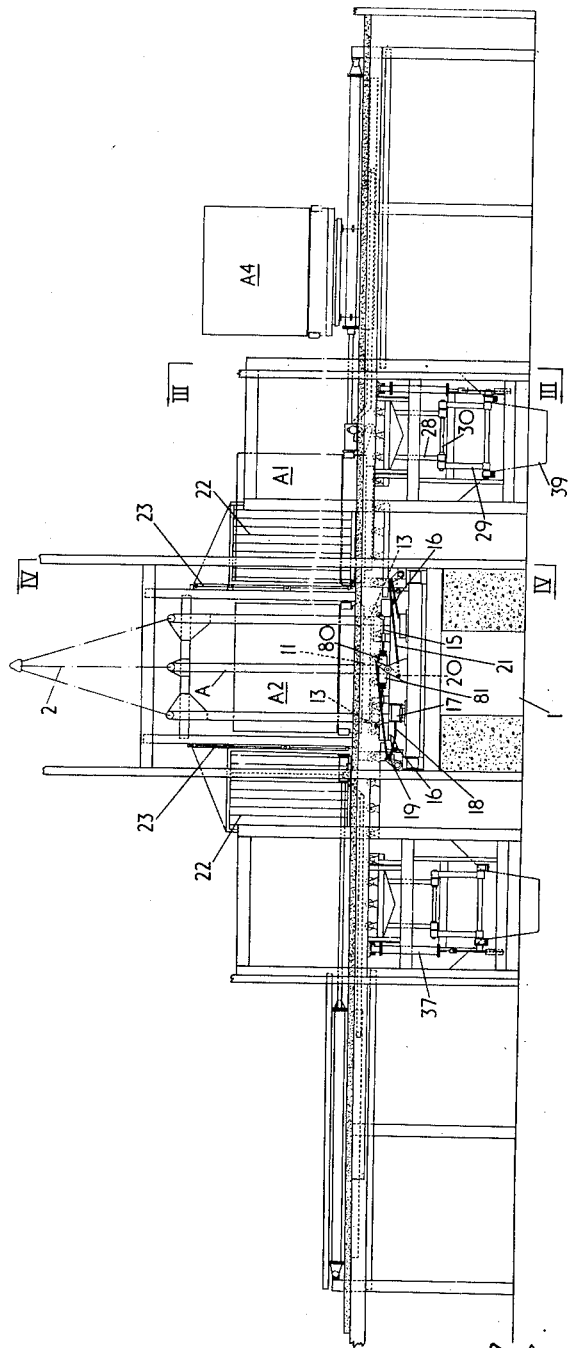

July 2, 1957     J. J. TORRANCE ET AL     2,797,834
RAISING OF COAL OR OTHER MINERALS IN MINE SHAFTS
Filed Aug. 24, 1954     12 Sheets-Sheet 1

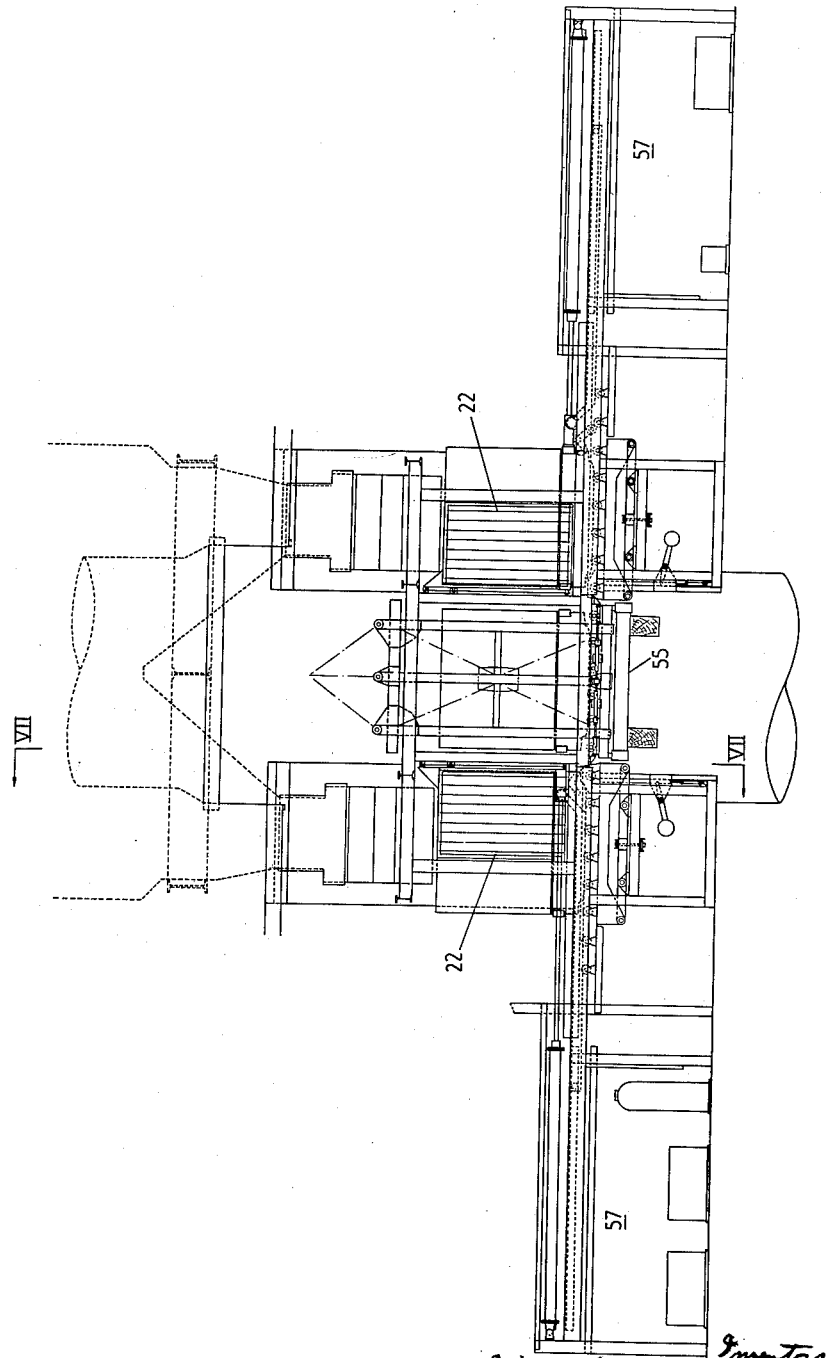

July 2, 1957 J. J. TORRANCE ET AL 2,797,834
RAISING OF COAL OR OTHER MINERALS IN MINE SHAFTS
Filed Aug. 24, 1954 12 Sheets-Sheet 6

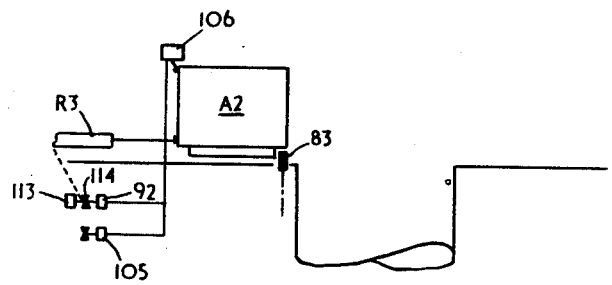
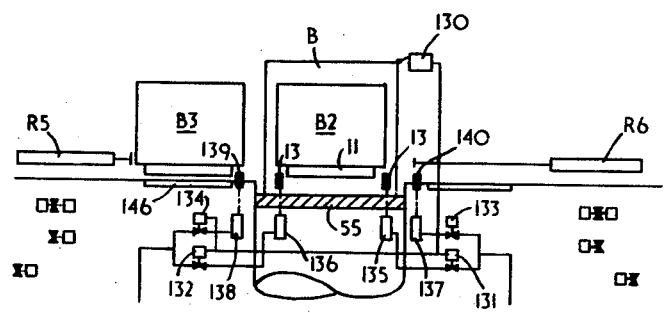

United States Patent Office 2,797,834
Patented July 2, 1957

2,797,834

RAISING OF COAL OR OTHER MINERALS IN MINE SHAFTS

John Johnston Torrance, Coalville, Leicester, and Frederick Ashley, Ashby-de-la-Zouch, England, assignors to Coal Industry (Patents) Limited, London, England Application August 24, 1954, Serial No. 451,894

Claims priority, application Great Britain August 27, 1953

7 Claims. (Cl. 214—623)

The invention relates to the handling of coal, ore or other material as delivered in containers by cage at the pithead of a shaft.

Such shafts are generally provided with two cages which are alternately raised and lowered so as to bring a full container or mine car to the surface for unloading, and to return an empty container to the pit bottom for loading. At the surface the containers are moved from the cage to a rotatable tippler to unload its contents.

One object of the invention is to enable conventional mine cars and traversers and tipplers and their associated equipment to be dispensed with, thus considerably reducing installation and maintenance costs and increasing output.

According to one aspect of the invention a plant for mechanically handling coal, ore or other material as delivered in containers by a cage at a pit head, comprises the combination with a mine cage operating in a shaft of at least three containers which are automatically movable at the top of the shaft alternately on to each one of a pair of opposed unloading platforms and are automatically movable at the bottom of the shaft alternately on to each one of a pair of opposed loading platforms, the movement of the containers, the loading and unloading of the containers being effected in a predetermined sequence initiated by means actuated upon the arrival of the cage and/or containers at the top and bottom of the shaft.

According to another aspect of the invention a plant for mechanically handling coal, ore or other materials as delivered in containers by cages at a pit head, comprises the combination with a pair of mine cages operating in a single shaft or in separate shafts of at least three containers per cage, the containers being automatically movable at the pit head alternately on to each one of a pair of opposed unloading platforms and being also automatically movable at the pit bottom alternately on to each one of a pair of opposed loading platforms, the movement of the containers the loading and unloading of the containers being effected in a predetermined sequence initiated by switching means actuated upon the arrival of the cages or the containers at the pit top and bottom.

The positioning of the containers on to loading platforms at the bottom of the shaft and on to unloading platforms at the top of the shaft may be effected by ram means, the ramming actions of which are initiated in a predetermined sequence by means actuated by the arrival of the cages at the top and bottom of the shaft, unloading of the containers being effected by further ram means and loading of the containers being effected from automatically controlled hoppers or the like, the unloading and loading being effected by means actuated by the correct positioning of the container to be loaded and the container to be unloaded on its loading or unloading platform.

Each container is provided with a hinged door, preferably in the bottom thereof, to permit the contents to be discharged at an unloading station, after displacement of the container from the cage at the top of the shaft. The containers may be as described in our co-pending application No. 25,064/51.

Each cage co-operates with three containers, or where a cage is adapted to accommodate a group of two or more containers, with three of such groups. The arrangement is such that a filled container No. 1 is moved into the cage at the bottom of the shaft, thereby displacing an empty container No. 2 from the cage to a loading station. The filled container No. 1 is then transported in the cage to the surface where it is displaced from the cage, to an unloading station, by an empty container No. 3 which takes its place in the cage. The cage is then lowered to the bottom of the shaft where the empty container No. 3 is displaced to a second loading station by container No. 2 which has in the meantime been filled. Container No. 2 is transported in the cage to the surface where it is displaced from the cage to a second unloading station by container No. 1 which has meantime been emptied. Container No. 1 is returned to the bottom of the shaft where it is displaced from the cage to the first loading station by container No. 3 at the second loading station which has meantime been filled. The filled container No. 3 is then returned to the top of the shaft where it is displaced by the empty container No. 2 which is returned to the bottom of the shaft thereby completing one cycle of operations of all three containers. Container No. 2 is displaced by the now loaded container No. 1 at the first loading station at the commencement of a second cycle of operations. Preferably two cages are provided per shaft, in known manner, so that when one cage is descending with an empty container the other cage is ascending with a full container.

Displacement of the containers is preferably effected by means of hydraulic rams or mechanical rams driven by hydraulic motors controlled by solenoid-operated hydraulic valves. The solenoids are controlled by switches operated through relays and contractors. Hydraulically-operated electrically controlled safety catches are also provided to ensure safety in operation and the system is adapted for fully automatic operation with provision for manual control of the sequence of operations in the event of an emergency.

The system according to the invention eliminates the necessity of an orthodox system of large run rounds, tub circuits, creepers and tipplers, with their associated housings above and below ground, and manpower is reduced to a minimum between loading point and screens. The shaft capacity is increased by bigger pay loads and quicker winding times and spillage is eliminated in and around the shaft. Further there is also very little coal dust about as compared with skip winding owing to the extended time being available when loading and unloading the container.

Figure 2:
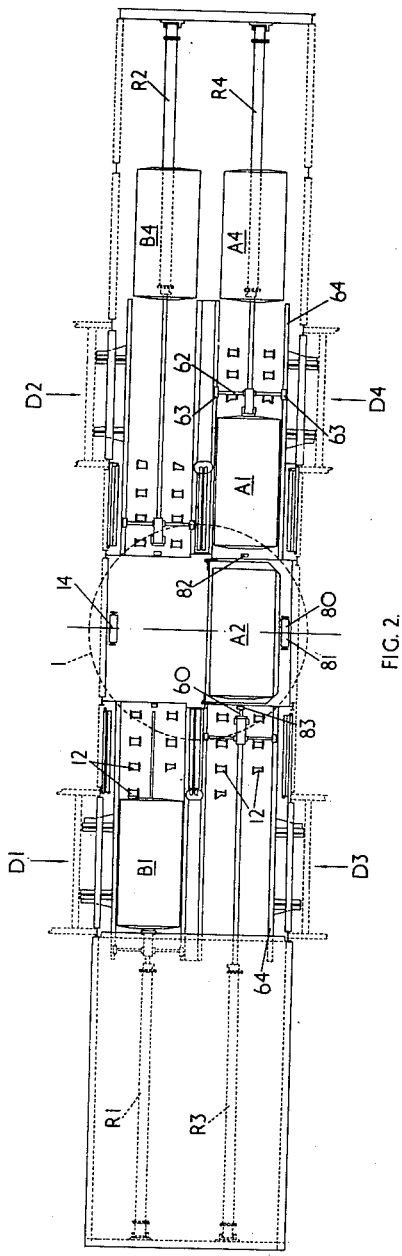
Figure 6:
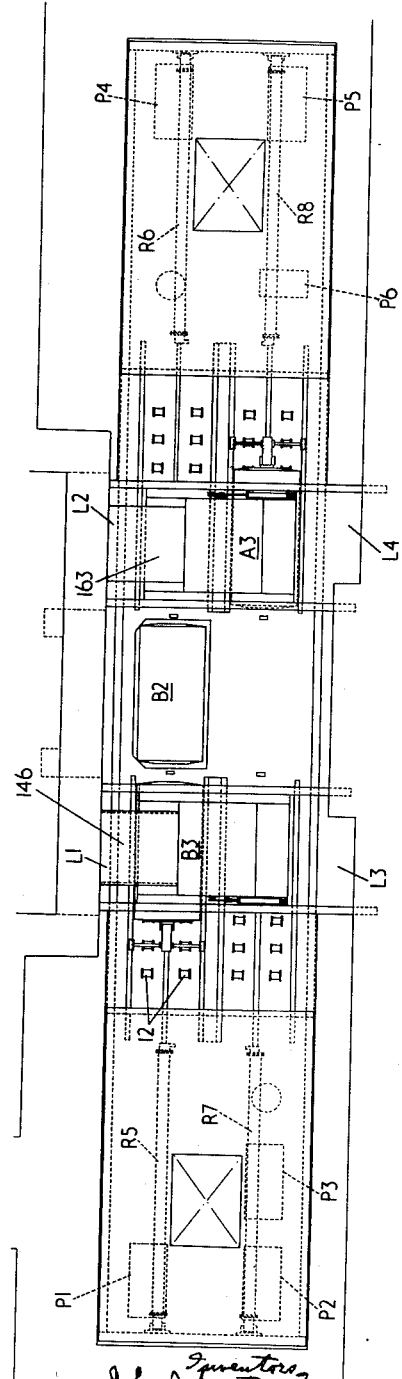
Figure 3:
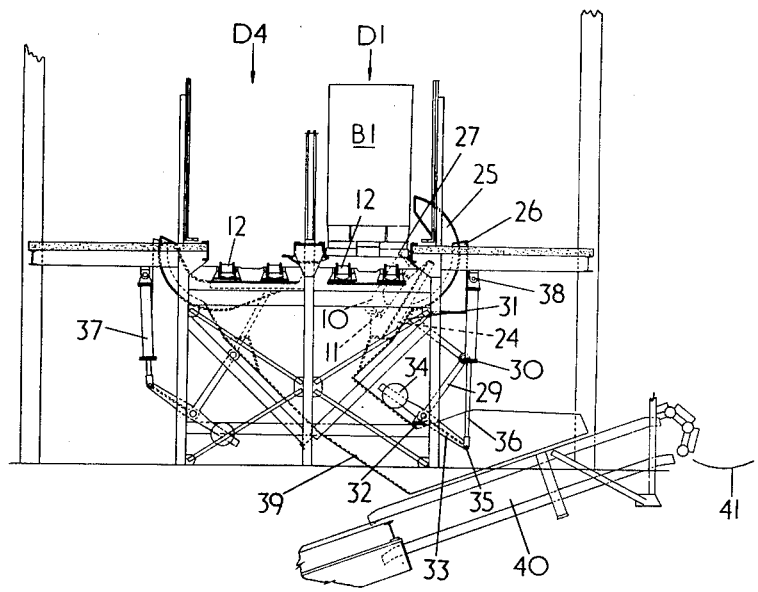
Figure 4:
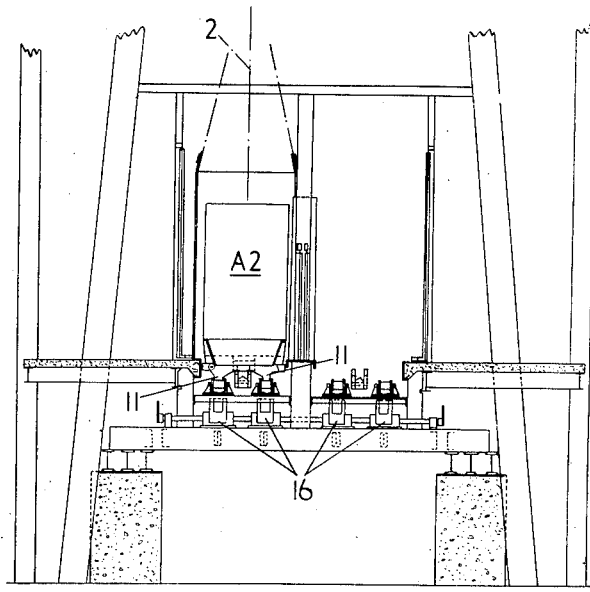
Figure 7:
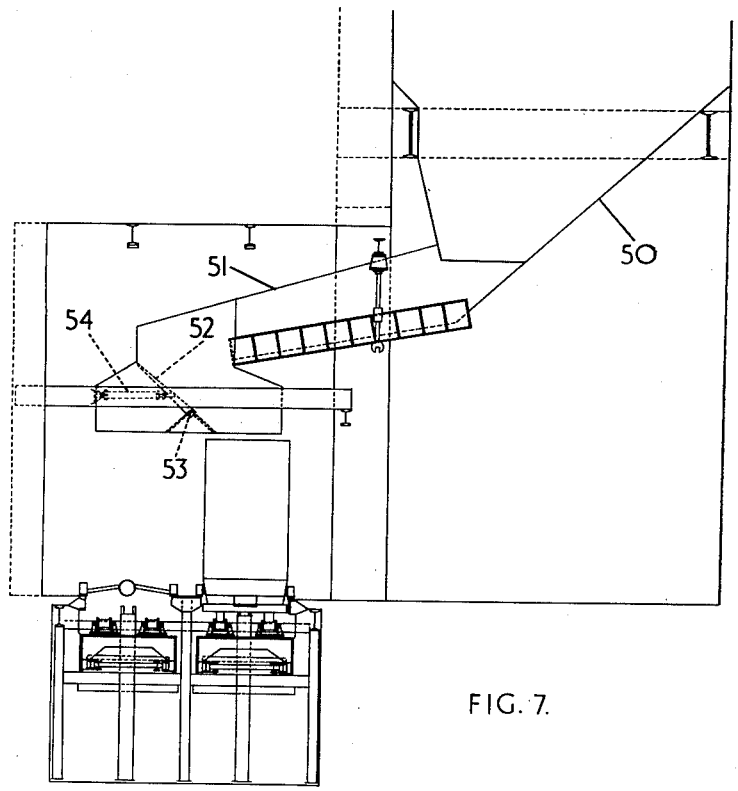
Figure 8:
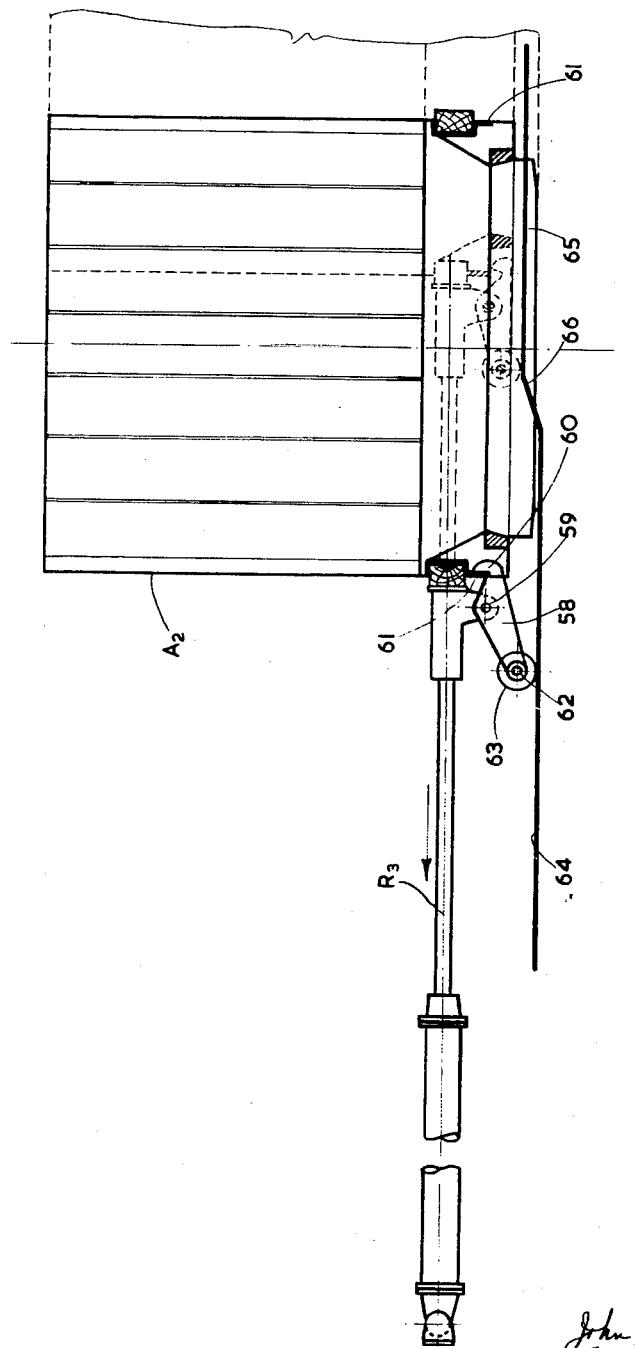
Figure 9:
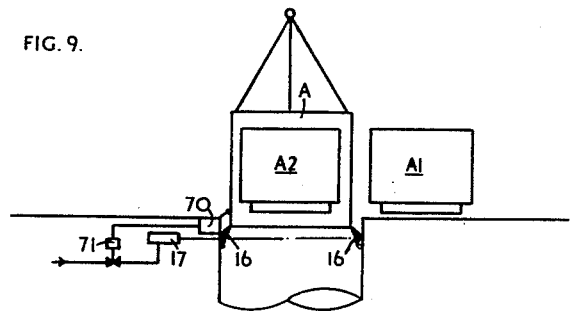

In order that the invention may be clearly understood an embodiment thereof will now be described by way of example with reference to the accompanying drawings in which:

Figure 1 shows in elevation that part of a coal raising plant according to the invention, installed at the top of the pit shaft, Figure 2 is a plan of part of the plant shown in Figure 1, Figure 3 is a section on the line III—III of Figure 2, Figure 4 is a section on the line IV—IV of Figure 1, Figure 5 shows in elevation that part of the plant according to the invention located at the bottom of the pit shaft, Figure 6 is a plan view of the part of the plant shown in Figure 5, Figure 7 is a section on the line VII—VII of Figure 5, Figure 8 is a side elevation of a container and of an operating ram therefor, Figures 9 to 21 are circuit diagrams of the electro-hydraulic control system for the mechanism at the top of the shaft, and Figures 22 to 29 are circuit diagrams of the electro-hydraulic control system for the mechanism at the bottom of the shaft.

Figure 30:
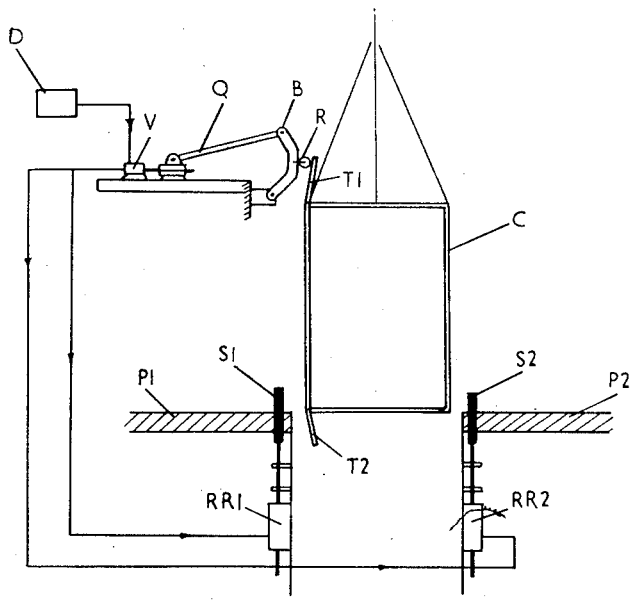

Figure 30 is a diagrammatic sketch of a safety hydraulic circuit.

Referring to the drawings, 1 represents the pit shaft in which are vertically movable two cages A and B suspended by a winding cable 2 so that when one cage descends the other ascends and vice versa. In the drawings cage A is shown at the top of the shaft in Figures 1 to 4 and cage B is shown at the bottom of the shaft in Figures 5 and 6. Cage A co-operates with three containers, A1, A2, A3 and cage B co-operates with three containers B1, B2 and B3. Spare containers are indicated at A4 and B4.

On opposite sides of the shaft 1 are four unloading or discharge stations D1, D2, D3 and D4, of which D1 and D2 serve cage B and D3 and D4 serve cage A. Similarly disposed at the bottom of the shaft are four loading stations L1, L2, L3 and L4 of which stations L1 and L2 serve cage B and stations L3 and L4 serve cage A. Associated with the unloading station at the top of the shaft are four hydraulic rams R1, R2, R3 and R4 and with the loading station at the bottom of the shaft are associated four rams R5, R6, R7 and R8. The rams at the top of the shaft serve to push an empty container into a cage at the top of the shaft and thereby displace from the cage a full container which is pushed and pulled to the unloading station opposite the ram. Similarly at the bottom of the shaft each ram serves to push a full container into a cage and at the time displace therefrom an empty container so as to push and pull the container to a loading station opposite the ram. The cycle of operations of the two cages and their associated containers are similar, except that when cage A is ascending cage B descends and vice versa.

In the positions shown in the drawings, container A1 is empty, A2 is full and A3 is being filled at the loading station. Ram R4 pushes the empty container A1 into position in the cage A thus displacing the full container A2 to the unloading station D3 where it is unloaded as will hereinafter appear. Cage A then descends to the bottom of the shaft where ram R8 pushes the filled container A3 into position in the cage thereby pushing the empty container A1 to the loading station L3. The cage then returns to the surface with the filled container A3 where the latter is pushed to the unloading station D4 by the ram R3 acting on the container A2 which in the meantime has been emptied. The cage with the empty container A2 therein then returns to the bottom of the pit where container A2 is displaced to the loading station L4 by the ram R7 acting on container A1 which has meantime been filled. Container A1 then returns to the surface where it is pushed to unloading station D3 by ram R4 acting on container A3.

Referring to the construction in greater detail, each container is provided with a hinged bottom 10 (see Figure 3) for permitting discharge of the contents at an unloading station. The bottom is provided with runners 11 which run on anti-friction rollers 12 arranged between the top of the shaft and the unloading stations, and between the bottom of the shaft and the loading stations, and in the cage itself. Each cage is provided with catches 13 operated by hydraulic cylinders 80, 81 through linkages 15, which catches co-operate with the ends of the runners 11 to hold a container in position within the cage. Co-operating with each cage are four keps 16, operated by hydraulic cylinders 17 through linkages 18, 19, 20 and 21, which keps serve to hold the cage in position at the top of the shaft while the rams act on the containers. The manner in which the hydraulically-operated mechanisms are controlled will be described hereinafter.

Between the shaft and each of the unloading stations is a gate 22 pivoted at 23. At each unloading station is a tipping platform 24 secured to arcuate members 25 movable in arcuate guides 26 to permit tipping of the platform about the axis 27 of the door 10 of the container, when the latter is in position on the platform, whereby the door 10 is permitted to open to discharge the contents of the container. Tipping of the platform is effected by means of a break-back linkage of which the two halves 28 and 29 are pivoted together at 30. Part 28 is pivotally attached to the platform 24 at 31 and part 29 is keyed to a shaft 32 to which is also keyed an arm 33. Arm 33 carries a counterweight 34 at one end and is pivotally connected at 25 at its other end to the end of the piston rod 36 of a hydraulic jack 37 of which the cylinder is pivotally mounted to a fixed support at 38. Energisation of the hydraulic jack, in a manner hereinafter to be described, rocks the shaft 32 to break the linkage 28, 29 to tilt the platform 24 thereby permitting the door 10 of the container to open and discharge the contents of the container into a hopper 39 which in turn discharges on to a plate conveyor 40 discharging on to a belt conveyor 41 which conveys the coal direct to the screening plant (not shown).

In Figure 3 of the drawings the container B1 is shown being discharged at the unloading station D1 on the right hand side of the figure, whereas the tipping platform 24 of the loading station D4 on the left hand side of the figure is shown in the raised position (container A1, not shown).

Referring now to Figures 5, 6 and 7, which show the loading mechanism at the bottom of the shaft, gates 22 are provided on opposite sides of the shaft as at the top of the shaft. At each pair of loading stations L1, L3 and L2, L4 is a feed hopper 50 (Figure 7) communicating through a feeder with a chute 51 having at its mouth a flap 52 hinged at its lower end at 53 and rocked about its pivot by a hydraulic ram 54 so that coal is loaded into a container at one or other of the stations of each pair L1, L3 and L2, L4, according to which is occupied by an empty container.

A supporting platform 55 is provided in the shaft for supporting the cage in its lowermost position. Adjacent the loading stations are pump rooms 56 and 57 containing the hydraulic pumps and oil reservoirs for the hydraulic system.

In addition to the function of pushing a container forward into position in the cage, each ram also has to serve a further purpose which is to tow a container into position at a loading or unloading station, as the case may be, during retraction of the ram. To this end it is necessary to provide a mechanical coupling between the ram and the container. The coupling must be such that the ram is automatically coupled to a container as the latter is pushed out of the cage by another container acted on by the opposing ram. Moreover, the coupling must be automatically uncoupled from the container when it has pushed it back into position in the cage after the container has been unloaded.

To this end each ram has pivoted thereto a rocking arm 58 (see Fig. 8) pivoted to the head of the ram at 59 and formed with a hook 60 at one end adapted to engage behind an abutment 61 on the container. At its other end arm 58 carries a transverse axle 62 furnished at opposite ends with wheels 63 running on tracks 64 extending between each loading and unloading station and the shaft. Adjacent the shaft each of the tracks 64 is formed with a raised portion 65, connected thereto by a ramp 66, so that as the ram pushes a container into the cage, the wheels 63 run up the ramps 66 so as to rock the arm 58 (clockwise in Fig. 8) to release the hook 60 from the abutment 61.

The operation of the hydraulic system is controlled by means of solenoid operated hydraulic valves, the energisation of the solenoids being controlled by switches operating through relays and contactors and actuated by the movable components of the plant. Electrical interlocking is employed to provide the necessary safety requirements.

In order that this control may be fully understood, operation of the hydraulic system at the top of the shaft will first be described with reference to Figures 9 to 21, each of which figures show only so much of the control system as is necessary for an understanding of the particular operation illustrated by that figure.

Figure 10:
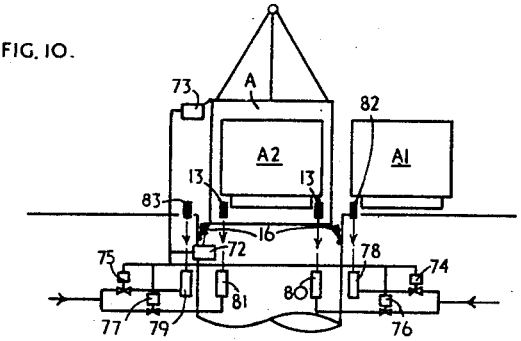
Figure 11:
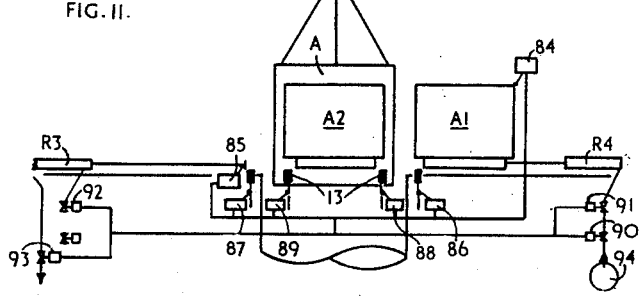
Figure 12:
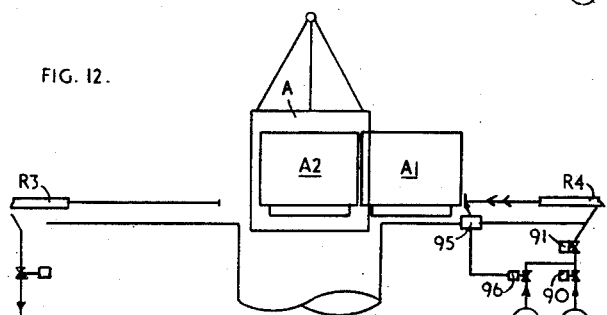
Figure 13:
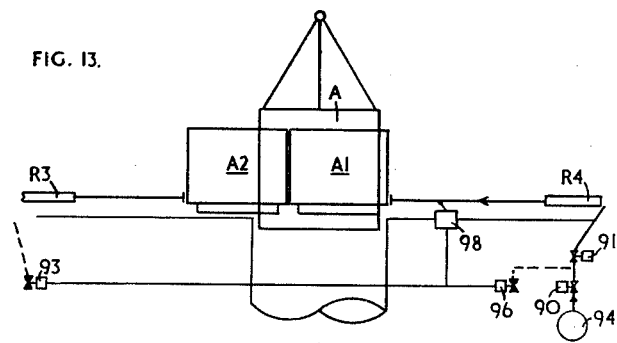
Figure 14:
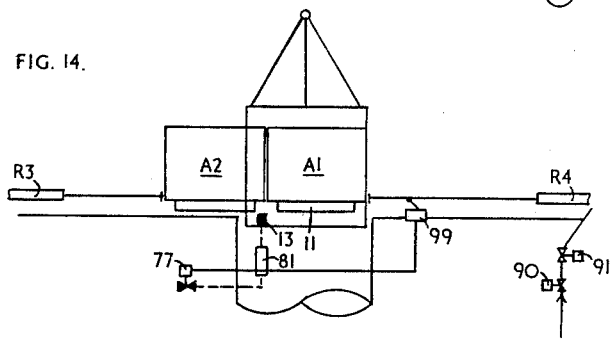
Figure 15:
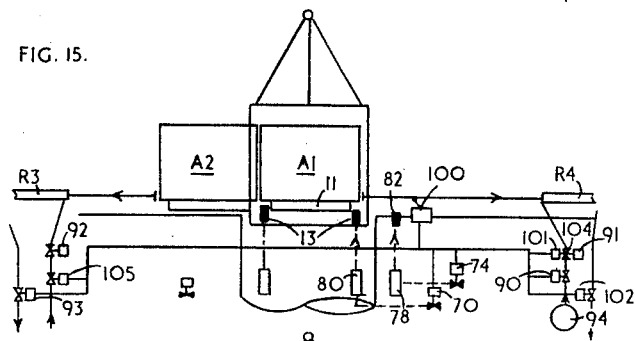
Figure 16:
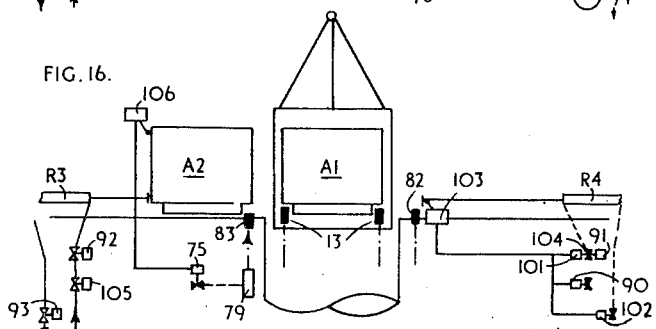
Figure 17:
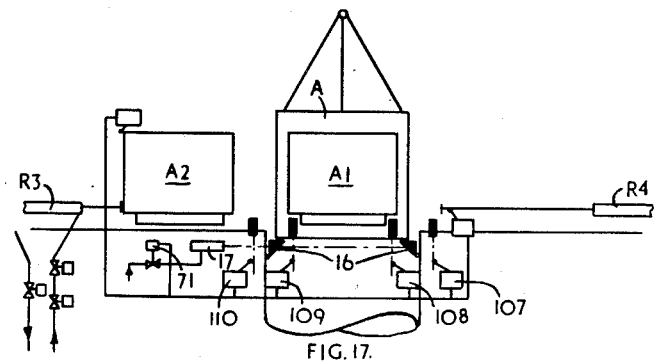
Figure 18:
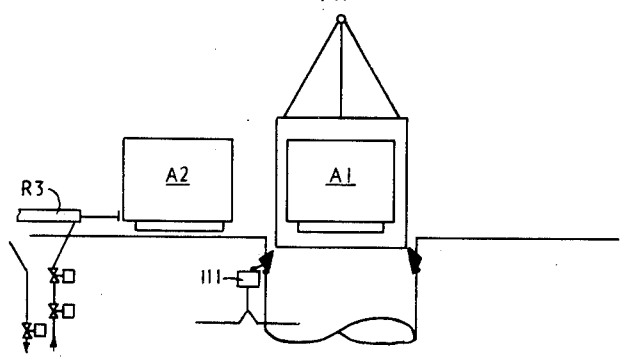
Figure 19:
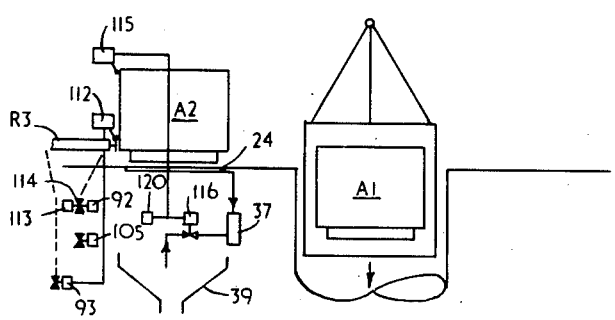
Figure 20:
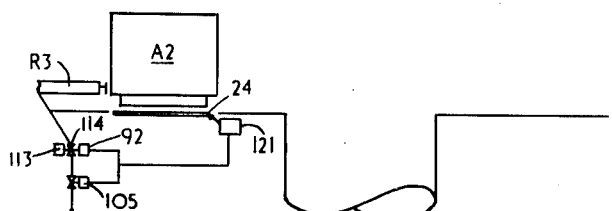
Figure 25:
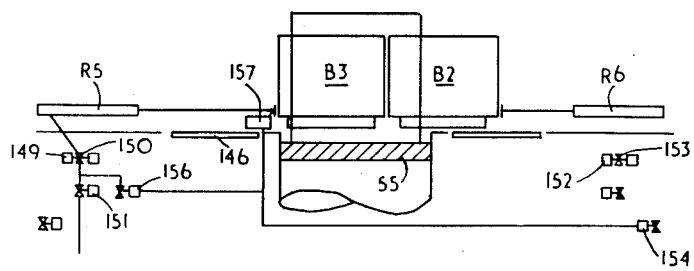
Figure 26:
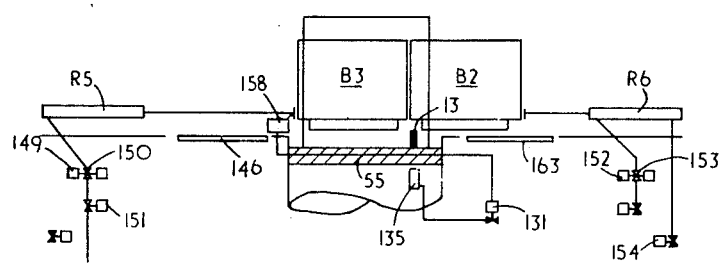
Figure 27:
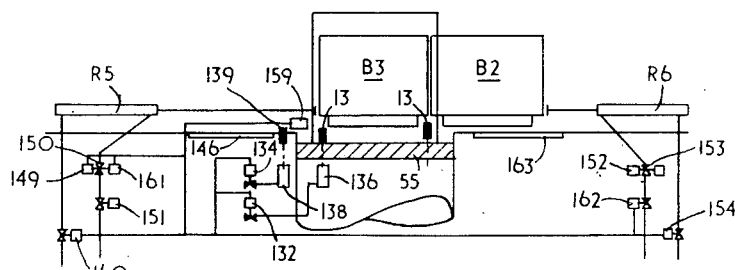
Figure 28:
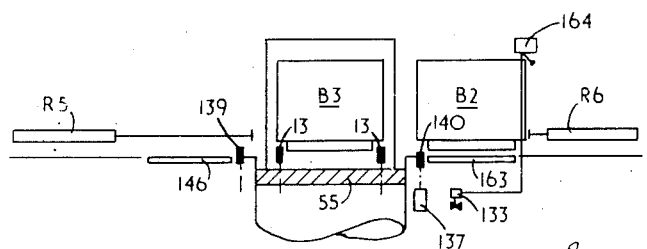
Figure 29:
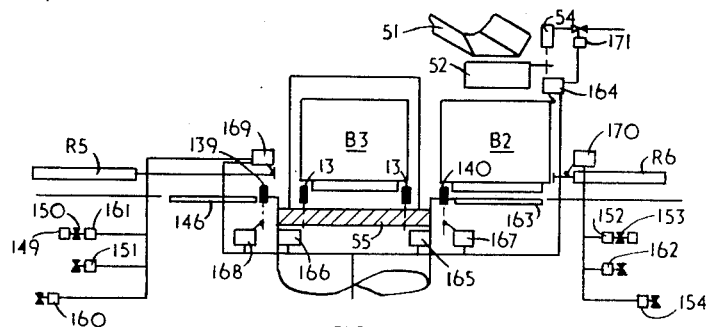

The cycle of operations will be described from the point when cage A, carrying the full container A2, reaches the top of the shaft. When the top of the cage passes through the landing level at the top of the shaft, it operates an electric switch 70 (Figure 9) which energises a solenoid operated valve 71 which causes liquid under pressure to be supplied to the hydraulic jack 17 to insert the four keps 16 beneath the cage (as shown in Figure 10). These keps are proved to be in the correct position by the operation of a switch 72 which is in series with a switch 73 engaged by the top of the cage A so that when both of the switches are actuated, the cage is proved to be in the correct position and the keps are proved to be inserted. Actuation of switches 72 and 73 energises four solenoid operated valves 74, 75, 76 and 77 to supply liquid under pressure to four hydraulic jacks 78, 79, 80 and 81 respectively to operate and withdraw safety catches 82 and 83 at the top of the shaft and the catches 13 within the cage. As previously mentioned, the catches 13 co-operate with opposite ends of the runners 11 on the container to hold the container in position in the cage. Catches 13, 82 and 83 are shown in their upper or operative position in Figure 10 and are shown retracted in Figure 11.

Further switches 86, 87, 88 and 89 are arranged to be actuated by the withdrawal of the safety catches 82 and 83 and of the cage catches 13 so as to prove that these catches have been withdrawn. Actuation of these switches effects the energisation of four solenoid operated valves 90, 91, 92 and 93. Energisation of the solenoid valve 90 causes a pump 94 to deliver liquid under pressure to the hydraulic ram R4 through the valve 91 which is set by energisation of its solenoid to select forward motion of the ram. Energisation of the valve 92 selects retraction of the ram R3 and energisation of the solenoid valve 93 permits passage of the liquid and so removes the brake effect from the ram R3. As a result of these connections, ram R4 is caused to move the empty container A1 forward at half speed until it reaches the position shown in Fig. 12 where it comes into contact with the full container A2 in the cage A. A switch 95 is arranged to be operated when the empty container A1 reaches this position of contact with the fuller container. Actuation of switch 95 effects energisation of the solenoid operated valve 96 so as to cause liquid under pressure to be delivered to the ram R4 from a further hydraulic pump 97, thereby accelerating the ram R4 to accelerate the containers A1 and A2 to maximum speed. Ram R3 is at the same time pushed back by the full container A2 which is automatically coupled to the ram by the engagement of the hook 60 on the ram head behind the abutment 61 on the container, as previously described with reference to Fig. 8.

As the empty container A1 approaches its correct position in the cage A (Fig. 13) ram R4 actuates an electric switch 98 to de-energise the solenoid valve 96 and 93 to shut off the supply of liquid from the second pump 97 (Fig. 12) to the ram R4 and to apply the brake effect to the ram R3 in order to reduce the momentum of the empty container A1 as it engages the cage catches 13. As the full container A2 clears the left hand cage catches 13 (as viewed in the drawings) but before the empty container has reached this position (see Fig. 14) a switch 99 is actuated by the ram R4 to de-energise the solenoid valve 77 whereby the hydraulic jack 81 resets the left hand cage catches between the two containers A1 and A2. When the empty container A1 reaches its correct position in the cage A, that is to say when the leading end of the runner 11 comes into contact with the reset left hand cage catches 13, a further switch 100 (see Fig. 15) is actuated by the ram R4 to initiate simultaneously the actions set out below. It should be mentioned that in this position the empty container A1 has been uncoupled from the head of the ram R4, by virtue of the wheels 63 on the rocking arm 58 running up the ramp 65, thereby rocking the arm 58 to disengage the hook 60 from the abutment 61, as hereinbefore described with reference to Figure 8 in connection with ram R3.

The actions initiated are:
1. Solenoid valves 74 and 76 are de-energised so as to cause the hydraulic jacks 78 and 80 to reset the safety catch 82 and the right hand cage catches 13 respectively.

2. The solenoid valve 91 is de-energised and a solenoid 101 is energised to reverse the direction of movement of the ram R4. (See Figure 15.) A further solenoid operated valve 102 is also energised to release the brake effect from the ram R4 to allow this ram to return to a position clear of the cage. In this position the ram R4 actuates a further switch 103 (Figure 16) which de-energises the solenoid valve 90 to shut off the supply of pressure liquid to the ram R4 from the pump 94. Solenoid 101 is also de-energised to allow the liquid reversing valve 104, controlled by solenoid 101 and by the solenoid 91, to take up a central position under the action of centralising springs, in which the liquid flow is shut off so as to produce a hydraulic brake effector locking of the ram R4.

Solenoid valve 102 is also de-energised at this point by the actuation of the switch 103 so as to apply the hydraulic brake effect to the ram R4.

3. Solenoid valve 93 is again energised to release the hydraulic brake effect from the ram R3 and a further solenoid valve 105 is energised to supply hydraulic liquid under pressure from a second pump to the ram R3 to withdraw the full container R2 towards the unloading station D3, it being understood that the full container A2 has meantime become coupled to the head of the ram R3 by the automatic action of the mechanical coupling hereinbefore described with reference to Figure 8. When the full container A2 has cleared the safety catch 83, the container actuates a further switch 106 which de-energises the solenoid valve 75, thereby causing the hydraulic jack 79 to operate to reset the safety catch 83.

When the above described conditions have been proved, that is to say when the ram R4, which has advanced the empty container A1, has been retracted to a position clear of the cage, and has operated the switch 103, and the full container has been proved to be clear of the safety catch 83 by the operation of switch 106 proving container clear of cage, and the safety catches 82 and 83 and cage catches 13 have all been proved to be reset by the operation of further switches 107, 108 and 110 (Figure 17), solenoid valve 71 is energised to cause the hydraulic jack 17 to operate to withdraw the keps 16. The keps are proved to be withdrawn by the operation of a further switch 111 (Figure 18) which is interlocked with the banksman's signal from the pit top. Immediately a signal has been received from the bottom of the shaft to indicate that a full container is in position in cage B, the banksman's signal is automatically transmitted to the winding engineman to lower cage A down the shaft.

The cycle of operations continues, the full container

A2 being pulled by the ram R3 on to the tipping platform 24 at an unloading station D3. When the full container is in the correct position on this tipping platform, the ram R3 operates a switch 112 (Figure 19) which de-energises solenoid valve 93 to shut off the supply of pressure liquid from the pump. Solenoid valve 93 is also de-energised by the actuation of the switch 112 so as to cause the application of a hydraulic brake effect to the ram R3 and a second solenoid 113 on reversing valve 114, which is also controlled by the solenoid 92, is de-energised to allow the valve to take up a spring centred position in which the flow of liquid is shut off and the ram R3 is hydraulically locked.

At the same time the full container A2 actuates a switch 115 which energises a solenoid valve 116 to apply a liquid under pressure to a hydraulic jack 37 to lower the tipping platform 24 thus discharging the load from the container A2 into the hopper 39.

Actuation of the switch 115 also starts an electrical timer 120 which after a preset period de-energises the solenoid valve 116 to cause the hydraulic jack 37 to raise the tipping platform 24 and at the same time close the door 10 of the container. The door is proved to be closed by the operation of a switch 121 (Fig. 20) which in turn re-energises the solenoid valve 105 to cause liquid under pressure to be delivered to the ram R3 from the pump. Solenoid 113 of the reversing valve 114 is also energised to select the forward direction of the ram R3 so as to move forward the now empty container A2 up to the safety catches 83. As the container A2 reaches this position it actuates the switch 106 to de-energise the solenoid valve 105 so as to shut off the supply of pressure liquid from the pump. Actuation of switch 106 also de-energises solenoid 113 of the reversing valve 114 so to allow this valve to take up its spring centred position in which the flow of liquid is shut off and the ram R3 is thereby hydraulically braked or locked.

The cycle of operations is now complete, and upon the return of cage A to the top of the shaft after it has been charged with a full container at the bottom of the shaft as hereinafter to be described, the above described cycle of operations is repeated but in the reverse direction, that is to say ram R3 pushes the empty container A2 into position in the cage so as to displace therefrom the now full container A3 which is withdrawn to the unloading station D4 by the towing action of ram R4.

The sequence of operations for unloading cage B is identical with that described above in connection with cage A.

The control of the hydraulic system at the bottom of the pit shaft will now be described with reference to Figs. 22 to 29 of the drawings. Referring first to Fig. 22, cage B with empty container B2 in position therein, is shown resting on the platform 55 at the bottom of the pit shaft. At this time cage A is at the top of the shaft. As cage B arrives in position on the platform 55 it operates an electric switch 130 which energises solenoid valves 131, 132, 133 and 134 to cause liquid under pressure to be delivered to the hydraulic jacks 135, 136, 137 and 138 to withdraw the cage catches 13 and safety catches 139 and 140 similar to the catches 82 and 83 at the top of the shaft.

Referring now to Fig. 23, the cage catches 13 are proved to be retracted by operation of switches 141 and 142 and the safety catches 139 and 140 are proved to be retracted by the operation of switches 143 and 144. Stopping of the coal feeder is proved by actuation of a switch 145 and the filled container B3 is proved to be in the correct position on a loading platform 146 by the actuation of a switch 147. The ram R6 is proved to be in the correct position clear of the shaft 1 by the actuation of a switch 148. When the above conditions have been proved by the operation of all the relevant switches from a previous cycle of operations, a solenoid 149 is energised to operate a reversing valve 150 to select forward direction of the ram R5. Solenoid valve 151 is also energised to connect the ram R5 to its corresponding pump so that liquid under pressure is delivered to the ram from a single pump thus causing the ram to move forward at half speed. At the same time a solenoid 152 of a reversing valve 153 for the ram R6 is energised to cause the valve 153 to select return direction for the ram R6, and a solenoid 154 is also energised to cause the hydraulic brake or lock effect to be released from the ram R6.

When the full container B3 makes contact with the empty container B2, the ram R5 operates a switch 155 (Fig. 24) which energises a solenoid valve 156 which connects a second pump to the ram R5 so as to accelerate the ram to full speed. The full container B3 is thereby caused to push the empty container B2 off the cage, at the same time pushing back the ram R6.

As the full container B3 approaches its correct position in cage B, the ram R5 operates a switch 157 (Fig. 25) which de-energises the solenoid valves 156 and 154. De-energization of solenoid valve 156 shuts off the supply of liquid under pressure from the second pump to the ram R5 and de-energisation of the solenoid valve 154 causes a hydraulic brake or lock effect to be applied to the ram R6. The full container B3 is thereby caused to move slowly into its final position in the cage B.

Before the full container reaches its correct position in the cage, say within 12 inches thereof, the ram R5 operates a switch 158 (Fig. 26) which de-energizes the solenoid valve 131 controlling the hydraulic jack 135 so that the right hand cage catches 13 as viewed in the drawings are permitted to reset to their upper position.

As the full container B3 comes into contact with the right hand cage catches 13, the ram R5 actuates a switch 159 (Fig. 27) which de-energises the solenoid valves 132 and 134 so as to allow the cage catches 13 and safety catch 139 to reset. The solenoid 149 of the reversing valve 150 of ram R5 is also de-energised to allow the valve to return to a spring centralised position so that the ram R5 is hydraulically locked against further motion. As the forward motion of the ram is stopped, a hydraulic brake is automatically applied thereto. A solenoid valve 160 is energised to release the brake on the ram R5 and a further solenoid 161 on the reversing valve 150 is energised to select return direction of the ram R5. Solenoid valve 154 is also energised to release the brake on the ram R6 and a solenoid valve 162 is energised to connect the ram R5 to a hydraulic pump for supplying liquid under pressure thereto. The ram R6 has meantime become automatically coupled to the empty container B2 by the action of the mechanical coupling described hereinbefore with reference to Figure 8, and energisation of the ram R6 causes it to pull the empty container B2 towards the loading platform 163 at loading station L2. At the same time ram R5 reverses until it is clear of the cage.

When the empty container B2 arrives on the loading platform 163 it operates a switch 164 (Figure 28) which de-energises the solenoid valve 133 so as to reset the safety catch 140. The cage catches 13 and the safety catches 139 and 140 are proved to be in the reset or raised position by the actuation of switches 165, 166, 167 and 168. Actuation of these switches, and of switch 164 to prove that the empty container B2 is clear of the cage, and a further switch 169 (Figure 29) to prove that the ram R5 has been reversed to a position clear of the cage, completes a circuit which automatically transmits a signal to the banksman and the engineman. Cage B is then ready for winding to the surface.

A switch 170 is operated by the ram R6 at the same time that the empty container B2 operates the switch 164. Actuation of switch 170 de-energises the solenoid 152 of the reversing valve 153 so as to cause this valve to return to its spring centred position to hydraulically lock the ram R6. Actuation of switch 170 also de-energises the solenoid valve 162 so as to shut off the supply of pressure liquid to the ram R6. Solenoid valve 154 is also de-energised to cause the application of the hydraulic lock or brake effect to the ram R6.

Actuation of the switch 169, in addition to proving clearance of the cage by the ram R5, also de-energises solenoid 161 of the reversing valve 150 of the ram R5 so as to cause this valve to return to its spring-centred position to stop the ram R5. Solenoid valve 151 is also de-energised to shut off the supply of pressure liquid to the ram and solenoid valve 160 is de-energised to cause the application of the hydraulic brake effect to the ram R5.

Switch 164, in addition to proving that the empty container B2 is clear of the cage, also energises a solenoid valve 171 to supply pressure liquid to the hydraulic jack 54 (Figure 7) to operate the two-way door chute 52 so as to turn the coal feed into the container B2 standing on the loading platform 163. A relay (not shown) is also energised to close a contactor starter to start up the coal feeder, for example a Sherwen feeder which loads the container from a bunker.

Each loading platform is preferably directly coupled to a hydraulic weighing apparatus which is so adjusted that when a container is loaded to capacity, a pressure switch in the hydraulic apparatus operates a pair of contacts to stop the coal feeder.

As can be seen from Figures 1, 2, 5 and 6, provision is made for withdrawing the rams beyond the loading and unloading platforms so as to withdraw the containers beyond these platforms to allow access to the cages for the winding of men and supplies.

It is to be appreciated that the removal of safety catches arranged to prevent containers moving into a shaft from off a loading or unloading platform may be a real danger, should a safety catch be inadvertently removed when the cage is not juxtaposed with a platform. If the safety catches are operated electrically, electrical maintenance testing may cause the safety catches to be removed and a container may then move into the shaft. This danger may be obviated by providing special protective circuits or in a preferred construction there is provided a mechanically actuated hydraulic valve at the top and bottom of a shaft the valve being actuated by the cage. The hydraulic valve is associated with a safety catch circuit of such a construction that the safety catches of the platforms are always in position and only removed by the cage per se when it is juxtaposed with any specific platform.

Referring now to Figure 30 a cage C moving upward into juxtaposition with unloading platforms $P_1$, $P_2$ has a trip plate T which contacts the roller R of bell crank B actuating the arm Q of the hydraulic valve V which causes oil from pump D to be forced into the ram means $RR_1$, $RR_2$ which remove the safety catches $S_1$, $S_2$. Catches $S_1$, $S_2$ are in position all the time until removed by the action of the trip plate T of cage $A_1$ on the roller R. A similar mechanism is provided at the bottom of the shaft to ensure the removal of safety catches on the loading platforms only when the trip plate $T_2$ actuates a hydraulic valve (not shown) at the bottom of the shaft.

We claim:

1. Apparatus for handling coal, ore or other mineral masses at a pit head comprising, in combination, a mine cage operating in a mine shaft and adapted to move between the pit head and a loading point lower down in the shaft; a pair of opposed unloading platforms located on opposite sides of the shaft at the pit head; a pair of opposed loading platforms located on opposite sides of the shaft at the loading point; containers movable from and onto the platforms to and from the cage when the cage is aligned with the platforms; a first pair of opposed first and second ram means disposed at the pit head, the first and second ram means being positioned in opposed relationship and associated with the unloading platforms; a second pair of opposed first and second rams disposed at the loading point, the first and second rams of the second pair being positioned in opposed relationship and associated with the loading platforms; operating means for operating the ram means of each pair in a predetermined sequence in reverse directions; and, means responsive to the arrival of the cage at the pit head and at the loading point for initiating the actuation of the operating means; said operating means moving one ram means of a selected pair of ram means forwardly toward the cage to push one container onto the cage, and push another container off of the cage, while simultaneously in predetermined sequence moving the other ram means of the selected pair of ram means rearwardly to assist in withdrawing the said other container from the cage and to act as a brake for the movement of the one container onto the cage.

2. Apparatus as claimed in claim 1, wherein automatically operated means is provided for coupling the ram means with a container whereby the container is coupled to the ram means to be withdrawn from the cage.

3. Apparatus as claimed in claim 2, wherein said coupling means includes an abutment member on each container, a pivoted hook member pivoted on each ram means and engageable with the abutment member, means supporting the hook member and an inclined trackway for said last means whereby the hook means is automatically moved into and out of engagement with the abutment member as the ram means is moved relative to the cage.

4. Apparatus as claimed in claim 1, wherein means is actuated by the movement of the one container onto the cage for controlling the operating means to control the operation of the other ram means.

5. Apparatus as claimed in claim 1, wherein keepers are provided for locking the cage in position at the unloading platforms, hydraulic jack means for moving the keepers under the cage in such position, and switch means activated by the cage upon its alignment with such platforms for actuating the hydraulic jacks.

6. Apparatus as claimed in claim 5, wherein safety catches are provided for holding the containers on the cage, said catches being automatically actuated to engage the containers by the movement of the containers into their proper positions on the cage and means responsive to the activation of said switch means for automatically disengaging the catches from a container already on the cage.

7. Apparatus as claimed in claim 6, wherein said means for initiating the actuation of the operating means is responsive to the release of the safety catches.

References Cited in the file of this patent

UNITED STATES PATENTS

| 1,508,921 | Castleman | Sept. 16, 1924 |
| 2,626,721 | Lodge | Jan. 27, 1953 |
| 2,693,770 | Hubscher | Nov. 9, 1954 |